United States Patent [19]
Levens

[11] 3,768,555
[45] Oct. 30, 1973

[54] WELL SYSTEM

[76] Inventor: Freer T. Levens, 2011 Winfield Rd., Midland, Tex.

[22] Filed: Feb. 3, 1972

[21] Appl. No.: 223,191

[52] U.S. Cl.................................. 166/67, 166/313
[51] Int. Cl............................................. E21b 43/00
[58] Field of Search..................... 166/67, 313, 306, 166/305 D, 89

[56] References Cited
UNITED STATES PATENTS

| | | | |
|---|---|---|---|
| 3,055,423 | 9/1962 | Parker | 166/306 |
| 2,593,497 | 4/1952 | Spearow | 166/306 |
| 1,816,260 | 7/1931 | Lee | 166/306 |
| 1,101,605 | 6/1914 | Wright | 166/305 D |
| 3,195,633 | 7/1965 | Jacob | 166/305 D |
| 2,983,318 | 5/1961 | Baker et al. | 166/313 |

*Primary Examiner*—James A. Leppink
*Attorney*—W. F. Hyer et al.

[57] ABSTRACT

A dually completed well system is provided which can simultaneously produce a brine from injected fresh water and dispose of a produced liquid, such as salt water produced from oil wells. In the systems, a cased borehole extends through one or more salt sections to a disposal formation. A disposal conduit extends from the surface to the disposal formation and is packed off so that the liquid to be disposed must flow into the disposal formation. At the same time, a fresh water injection conduit is installed in the well and packed off so that fresh water pumped down through this conduit will flow out through openings in the casing into the salt section. While such water is in this section, it dissolves salt and becomes brine which is displaced up the casing by the incoming new fresh water.

5 Claims, 1 Drawing Figure

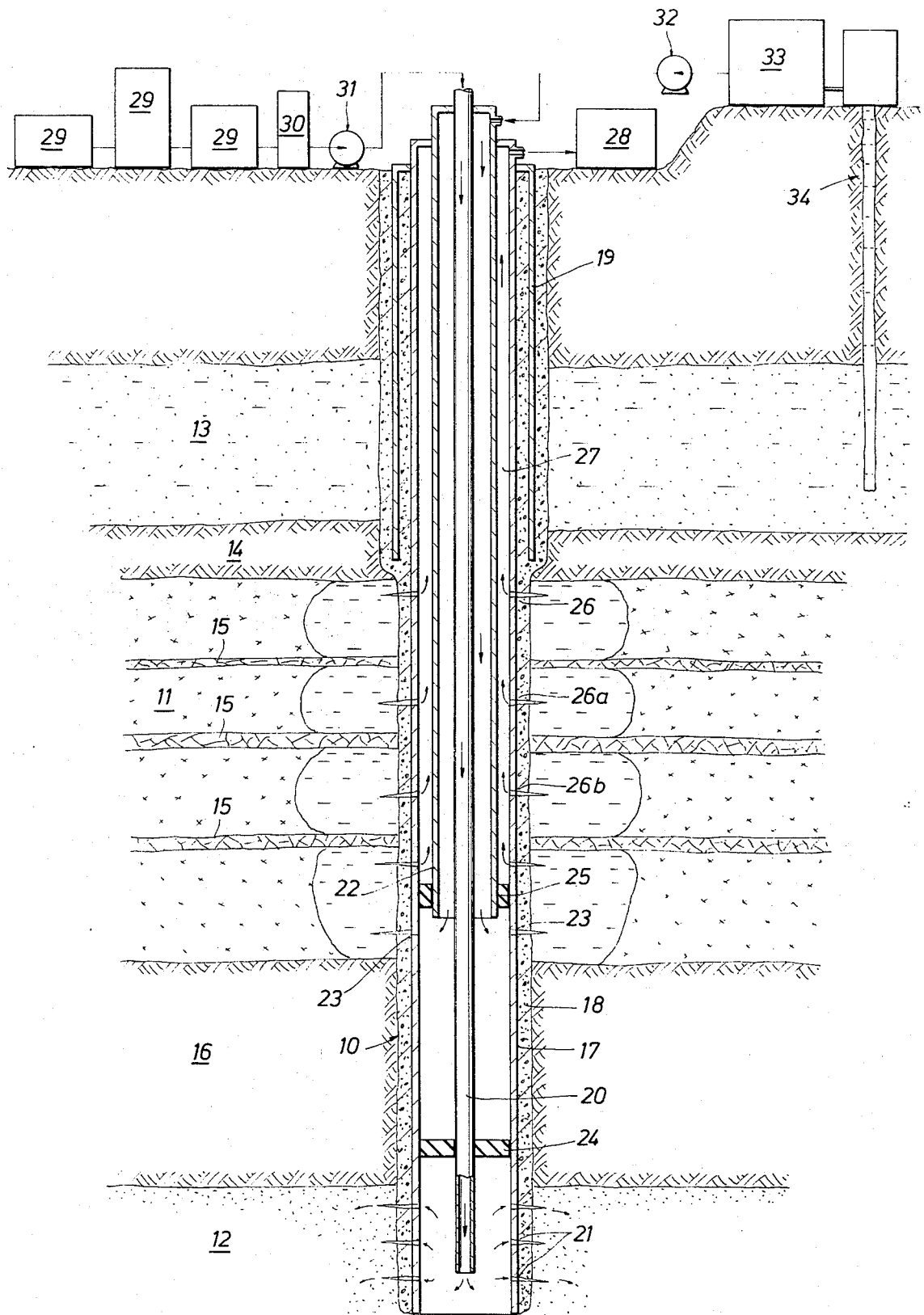

WELL SYSTEM

This invention relates to a dually completed well system which can simultaneously dispose of produced liquids and generate a salt water brine.

In some areas, especially in West Texas, oil and gas wells are drilled using salt water brine as the major component of the drilling mud. At the present, it is a common requirement of purchasers of this brine that it contain enough dissolved salts to weigh at least 10 pounds per gallon. Also, in these areas, the oil and gas wells commonly produce a produced fluid loosely called "salt water" and which is water contaminated with dissolved ordinary salt, gyp, and other water soluble materials. Years ago, this salt water was separated from the oil and gas and disposed of by flowing it into open ponds (where it would evaporate) and even into streams and rivers. However, the state regulatory bodies recognized the adverse ecological effects of this and required that the salt water be disposed of in other manners. One common way of disposing it is to drill a salt water disposal well down to a permeable formation and then to flow the salt water, by gravity or under pump pressure, into this formation. The disposal formations must be at depths substantially below the upper fresh water formations so that there is enough intervening impervious formations to assure that the salt water will not flow upwardly to contaminate the fresh water formations. The operation of these salt water disposal wells is rather expensive. Also, this is an expense as such which must ultimately be charged back, in one way or another, as part of the cost of producing the original oil and gas. Thus, in a sense, the operation has a "cash flow" which is always negative and never produces any revenue.

It is an object of this invention to provide a dually completed well system which can simultaneously produce a saleable brine from a salt section while at the same time disposing of produced liquid (such as salt water) by injecting it into a disposal formation whereby, in a single well, the expense of disposing of the produced liquid is at least offset by the revenues generated from the production and sale of brine.

Another object is to provide such a dually completed well system in which the two operations can be simultaneously conducted and wherein the disposal formation lies below the salt section from which the brine is generated to afford an even greater assurance that the produced liquid being injected into the disposal formation will not contaminate upper fresh water formations.

Another object is to provide such a system which can readily be employed in conjunction with a previously drilled well which has become economically nonproductive thereby using this well not only to dispose of produced liquid or salt water, but also to generate revenue producing brine so that the originally essentially useless well can be employed to obtain two beneficial functions.

Other objects, advantages and features of the invention will be apparent to one skilled in the art upon consideration of the written specification, the claims and the attached drawings wherein there is shown, somewhat schematically, a preferred embodiment of this invention installed in a borehole in the earth.

In the drawing, a borehole 10 has been drilled into the earth to penetrate the salt section 11 and to extend to or into a disposal formation 12. Disposed above the salt section 11 is a fresh water formation 13 and normally the fresh water formation and the salt section will be separated by an impervious formation 14 which may comprise hard limestone, shales, and the like. It is formation 14 which prevents the contamination of the fresh water in formation 13 from salt as it may exist in the salt section.

The salt section may vary in depth and in thickness. Also frequently, it will be interrupted with other sections, particularly gyp or anhydrite layers 15.

It will also be appreciated that there may be one or more disposal formations and that these may lie at varying depths below the salt section. However, in any case, the disposal formation is selected so that an impervious formation 16 lies above it and between it and the salt section so any liquid pumped into the disposal section will not intrude into the salt section.

A string of production casing 17 extends to the bottom of the hole and is cemented in place by cement 18. While a single string of production casing has been shown in the drawing, it will be appreciated by those skilled in the art that there may also be one or more intermediate strings of casing as well as various liners, etc. In any event, there is in effect provided a casing string extending from the bottom to the surface which is cemented along its length to the earthen formations surrounding it. In some cases, it may not be necessary to cement the entire length of casing but even in such instances, the section of casing extending through formation 16 should be cemented to prevent communication between the salt section and disposal formation 12. Likewise, the length of the casing above formation 14 should be cemented to protect the fresh water sands 13. In this connection, a surface casing 19 can be cemented in place exteriorly of the production casing to provide double protection for the fresh water sands.

A produced liquid injection tubing 20 extends from the surface to the disposal formation 12 and is in fluid communication with it via perforations 21. A fresh water injection tubing 22 extends from the surface to a point below the upper regions of the salt section 11 and preferably to a point adjacent the lower part of such section as shown in the drawing. At any rate, it is in fluid communication via perforations 23 with the salt section.

Packer means 24 is provided between the produced liquid injection tubing 20 and casing 17 preventing flow of produced liquid from tubing 20 into the fresh water injection tubing 22 or into the salt section 11. Similarly, packer means 25 is provided between the fresh water injection tubing 22 and the casing 17 to prevent the fresh water flowing from the lower end of the tubing directly upwardly into the annulus between the casing and the fresh water injection tubing. Instead, such water is forced out through perforations 23 into the salt section where it can dissolve salt and become the desired brine. Thus as the fresh water is pumped out into the salt section, it displaces brine through perforations 26 into the annulus 27 and causes it to flow upwardly to the surface to be finally deposited in tank 28.

It is preferred that the brine exit openings or perforations 26 be situated at or near the top of the salt section so that the injected fresh water will have a maximum residence time in the salt section to assure adequate dissolution of salt therein. However additional lower perforations, such as 26a and 26b, can be provided especially if the salt section is interspersed with imperforate layers of other formations. In this connection, when these layers such as 15 are anhydrite or gyp, it has been found that the cement between them and the casing does not form an impervious bond with these layers. Therefore, even if the production casing has been cemented across the entire salt section including these layers, water can still flow from a lower salt layer to an upper salt layer around the outside of the cement adjacent the gyp stringers. Therefore, fresh water can be injected in the lower part of such a salt section and will ultimately work its way upwardly so that it can pass out of the uppermost perforation 26.

Surface means are provided for passing the produced liquid into the produced liquid injection tubing 20. Such means can include various tanks 29 for storing or treating the produced liquid, a filtration tank 30 and a pump 31. In some cases, the disposal formation 12 will have sufficient permeability that the hydrostatic head of the produced liquid in tubing 12 alone will be enough to cause the produced liquid to flow out into the formation. In such cases, the pump 31 can be eliminated and gravity flow employed.

Means are also provided for pumping fresh water into the fresh water injection conduit 22. This means can include a pump 32 taking suction from a fresh water storage tank 33. If desired, a fresh water well 34 can be provided as a source of the fresh water. The term "fresh water" as used herein will normally mean naturally occurring water from various sources, such as wells, rivers, etc. It may contain small amounts of various salts. In some cases, the amounts of these salts will be high enough that the water will not be potable, but in any event, the amount will be less than that desired in the finished brine.

It is believed the operation of the system will be obvious from the foregoing description. It will be seen that a produced liquid, such as salt water from a producing oil or gas well, can be disposed of into a lower formation while simultaneously passing fresh water into the well to produce a satisfactory brine. The system has considerable flexibility in that these operations can be conducted simultaneously or one of them can be terminated while the other one continues according to the particular circumstances.

The term "produced liquid" as used in the specification and claims is intended to cover not only "salt water" produced from oil and gas wells but also other liquids can be disposed of by flowing into a disposal formation. Examples of some "produced liquids" other than "salt water" are spent caustic solutions; water contaminated with various chemicals such as phenols; liquid waste streams from paper mills, petrochemical plants; etc.

From the foregoing description of one embodiment of this invention by way of example, it will be seen that this invention is one well adapted to attain all of the ends and objects hereinabove set forth, together with other advantages which are obvious and which are inherent to the system.

The invention having been described, what is claimed is:

1. A dually completed well for simultaneously producing a brine from a salt section while at the same time disposing of a produced liquid by injecting it into a disposal formation, said well having a naturally occurring salt section and a disposal formation, a borehole penetrating each of said salt sections and said disposal formation; conduit means in the well providing (i) a fresh water injection conduit from the surface into said salt section (ii) a brine conduit from said salt section to the surface and (iii) a produced liquid injection conduit from the surface into said disposal formation; packer means preventing flow from said fresh water injection conduit directly into said brine conduit and cooperating with said conduit means to direct such flow into said salt section so that said fresh water can dissolve salt to form a brine for flowing into said brine conduit; packer means preventing flow of produced liquid from said produced liquid injection conduit into said fresh water injection conduit, said brine conduit and said salt section while permitting flow into said disposal formation; surface means for passing produced liquid into said produced liquid injection conduit; and pump means for pumping fresh water via said fresh water injection conduit out into said salt section and thereby displacing brine therefrom through said brine conduit to the surface.

2. The well of claim 1 wherein said surface means for passing produced liquid into said produced liquid injection conduit includes pumping means for pumping said produced liquid under pressure into said produced liquid injection conduit.

3. A dually completed well for simultaneously producing a brine from a salt section while at the same time disposing of a produced liquid by injecting it into a disposal formation, said well having a naturally occurring upper subterranean salt section and a lower disposal formation; a borehole extending to said disposal formation and intersecting said salt section; a production casing in the borehole and cemented therein at least through a portion of the interval between said disposal formation and said salt section to prevent fluid communication therebetween exteriorly of the casing; a produced liquid injection tubing extending from the surface to below said salt section and being in fluid communication with said disposal formation; a first opening through the wall of the casing from said salt section through which the brine is to flow; a fresh water injection tubing extending from the surface to at least below said first opening; said casing having a second opening below the first opening for flow of fresh water from said fresh water injection tubing into said salt section; packer means sealing between said produced liquid injection tubing and said casing at a location below said second opening; packer means sealing between said fresh water injection tubing and casing at a point intermediate said first and second openings and preventing flow of fresh water from said fresh water injection tubing directly upwardly into the space between said casing and fresh water injection tubing so that said fresh water will flow out through said second casing opening into said salt section; surface means for passing produced liquid into said produced liquid injection tubing; and means for pumping fresh water into said fresh water injection conduit for flow through said second casing opening into the salt section to dissolve salt and form a brine and to displace such brine through said first casing opening into said casing for flow to the surface.

4. The well of claim 3 wherein said produced liquid injection tubing extends through said fresh water injection tubing and the second mentioned packer means seals between said fresh water injection tubing and said casing.

5. The well of claim 3 wherein a second outer casing surrounds said production casing from the surface to a level above said salt section and cement is deposited to form a seal between said second casing and said production casing and also between said second casing and the formations around it to protect fresh water formations above the lower end of said second casing.

* * * * *